Figure 3:
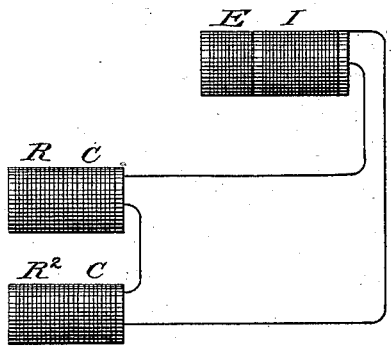

(No Model.)
F. W. JONES.
MEANS FOR OVERCOMING STATIC DISTURBANCES IN TELEGRAPHY.
No. 310,684. Patented Jan. 13, 1885.
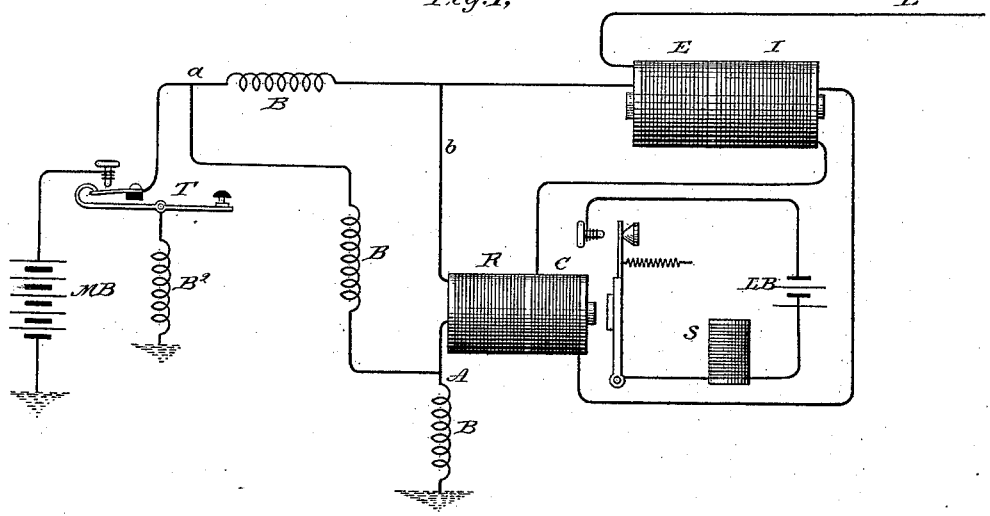
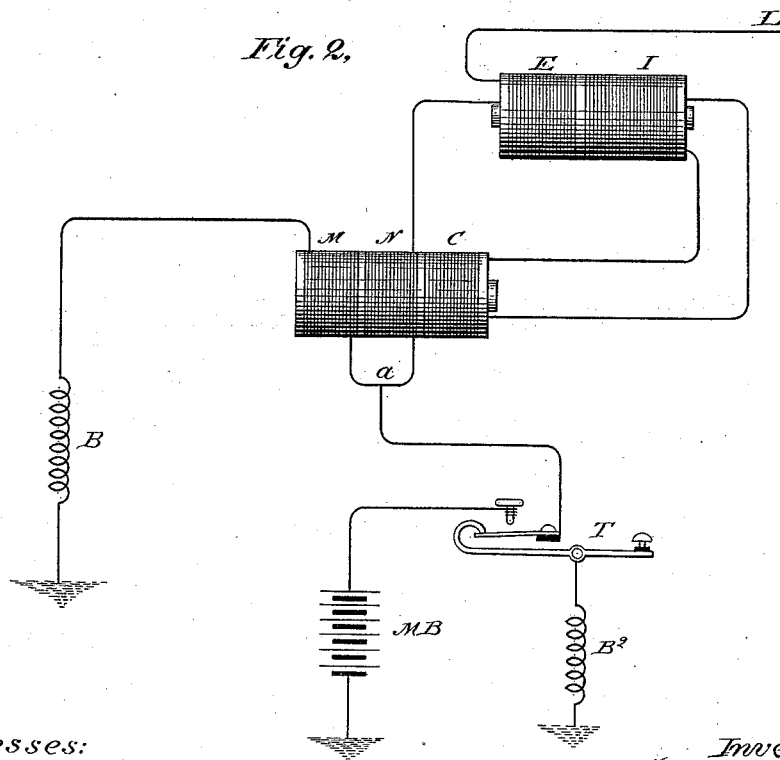

(No Model.) 2 Sheets—Sheet 2.
F. W. JONES.
MEANS FOR OVERCOMING STATIC DISTURBANCES IN TELEGRAPHY.
No. 310,684. Patented Jan. 13, 1885.

Witnesses:
Alx. Scott
Jac. W. Graham

Inventor:
F. W. Jones
by H. C. Townsend
Atty.

UNITED STATES PATENT OFFICE.

FRANCIS W. JONES, OF NEW YORK, N. Y.

MEANS FOR OVERCOMING STATIC DISTURBANCES IN TELEGRAPHY.

SPECIFICATION forming part of Letters Patent No. 310,684, dated January 13, 1884.

Application filed March 13, 1884. (No model.)

*To all whom it may concern:*

Be it known that I, FRANCIS W. JONES, a citizen of the United States, and a resident of New York, in the county of New York and State of New York, have invented certain new and useful Improvements in Static Compensators for Duplex and Multiplex Telegraphs, of which the following is a specification.

My invention relates to duplex or multiplex telegraphs; and it is designed to afford a simple and effective device for neutralizing or compensating for the disturbing effects upon the receiving apparatus of the so-called "static charge and discharge current" due to differences in the static capacity of the main and artificial lines. It has hitherto been proposed to compensate for the disturbing tendency due to this cause by placing an electro-magnet in the main line at a point beyond the point of division of the main and artificial lines. The action of the magnet when placed in this position is, as is well understood in the art, to prevent any disturbance due to momentary want of balance in capacity between the main and artificial lines when the main-line battery begins to flow, by checking or retarding the momentary tendency of the current to flow to the line in greater proportion than to the artificial line. Its action in this respect is due to the well-known inductive action of the magnet's coils upon one another and the retarding or counter-inductive action of the magnet's core. When the main-line battery is withdrawn at the completion of a signaling impulse, there is set up in the coils of the magnet an induced or extra current which meets and cuts down or neutralizes the static discharge-current coming from the line. The effective capacity of an electro-magnet used in this way is limited by reason of the fact that in order to obtain sufficient effects from it the length of the coil must be made so great that the added resistance thereby introduced into the line becomes objectionable. It is moreover difficult to obtain in any case a neutralizing action from said magnet sufficient to overcome the pronounced and strong effects of the static charge and discharge.

The aim of my invention is to superadd to the neutralizing effects due to the presence of the magnet the effects of a secondary current obtained from a secondary coil wound over, upon, or in suitable inductive proximity to said magnet, said secondary coil being connected in a local closed circuit with means—such, for instance, as a magnet-coil—that is arranged to exert, by means of the secondary current flowing in it, an opposite effect upon the receiving apparatus to that which the so-called "static charge and discharge current" tends to produce.

Figure 4:
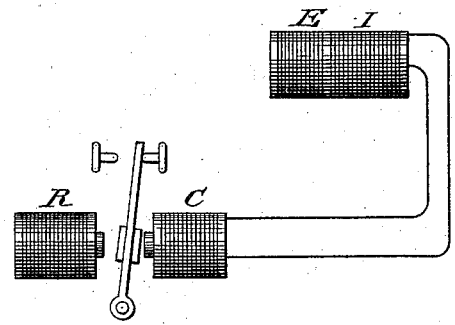
Figure 5:
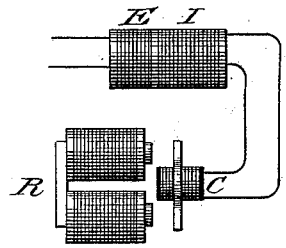

In the accompanying drawings, Figure 1 is a diagram illustrating one method of applying my invention to a Wheatstone-bridge duplex. Fig. 2 illustrates the application of the invention to a duplex telegraph in which the receiving relay-magnet is differentially wound with two sets of coils, one in the main and the other in the artificial line. Fig. 3 illustrates a modified arrangement. Fig. 4 shows an equivalent way of applying the compensating effects of the secondary current to the receiving-relay. Fig. 5 illustrates another way of applying the compensating current to the receiving apparatus.

Referring to Fig. 1, R indicates the electro-magnet of any receiving-relay, placed in a bridge-wire between the main and artificial lines of a duplex telegraph.

L indicates the main line, and A the artificial line, *a* being the point at which the circuit from the transmitter T divides.

B B indicate the usual artificial resistances used for producing the proper balance between the main and artificial lines.

M B is the transmitting-battery, and $B^2$ an artificial resistance in the usual earth-connection from the transmitter.

The transmitter T and the other parts and connections are of the usual and well-known kind employed in duplex telegraphy, and need not be described further in detail.

S indicates the receiving-sounder, and L B the local battery, controlled by the relay R.

E indicates an electro-magnet in the line-circuit at some point between the point *a* and the main line proper, preferably at a point beyond the bridge-wire *b*. This magnet is of any desired form, and of itself would act to compensate for the disturbing tendencies of the static charge and discharge current. In connection with said magnet I employ a secondary coil, I, consisting of a coil of insulated wire of any proper size or length for producing a neutralizing-current of the desired power. The wire I is wound preferably over the same core with the coils of the magnet E, and over, under, beside, or between said coils, so that the flow of current in coils E will induce a secondary current in the coils I. The coils I under such conditions obviously bear the same relation to the coils E that the secondary coil of a so-called "inductorium" or induction-coil bears to the primary coil. The special arrangement or relation of such coils is immaterial, provided they be properly arranged to permit the current flowing in coils E to induce in coils I a secondary current. The coils I are placed in circuit with a device for exerting upon the receiving-instrument an effect counter to that which would be produced by the static charge or discharge current if allowed to act on opposed.

In Fig. 1 coils I are shown as in circuit with coils C applied to the relay-magnet, and connected in such a way that the current flowing in them and induced in the coils I by the putting of the battery M B to line will act contrariwise upon the relay-magnet to any current which may at such instant flow from the artificial to the main line in the bridge-wire $b$ by reason of the difference in charge capacity of the main and artificial lines. The coils C are in Fig. 1 shown as wound upon the relay-magnet itself, so that the current flowing in them shall neutralize the magnetism of the core, which would otherwise be produced by the current flowing in the relay-coils proper, and shall, therefore, at such time render the relay incapable of affecting the circuit of the sounder and producing a false signal. The coils C may be applied in any other desired manner to effect this result. For instance, they may, as shown in Fig. 4, be the coils of a magnet which exerts upon the relay armature-lever a pull contrary to that exerted by the relay-magnet. In such case the relay armature-lever may have a second armature upon which the core of coils C shall act, or said core might be made to act upon the armature proper. The coil C might, if desired, be wound upon the armature itself of the relay, as indicated in Fig. 5, which represents a relay-magnet and armature in plan view. In practice it is of course desirable to make the coils of E of coarse wire and the coils I of fine wire.

The action of the apparatus in compensating for the static discharge-current is just the reverse of that which takes place when the static charge is compensated for. Any static discharge-current which may flow from line L through the bridge-wire $b$ to the artificial line A will set up in the coils I an induced current that, flowing in coils C, will counteract the effect of such discharge-current upon the relay.

In Fig. 2 the application of my invention to an ordinary differential duplex is shown.

R indicates the electro-magnet of the relay, having the two sets of coils M N, which are respectively in the artificial-line circuit A and the main-line circuit L, and are wound or connected in the well-known manner, so that outgoing currents will not effect the relay.

Other parts corresponding to those shown in Fig. 1 are indicated by the same letters of reference. The action is the same in principle as in the case of the form of duplex shown in Fig. 1. The tendency to disturbance arising from the fact that when the battery M B is first put to line more current flows in N than in M, is counteracted, first, by the retarding influence of the coils of magnet E, and secondly, by the induced current set up in the local circuit containing coils C and I. The tendency to disturbance from the effects of static discharge-current flowing in coils N M is offset by the extra current in coils E and the induced current in coils C, which, under such circumstances, would flow in an opposite direction and properly to counteract the static discharge-current flowing in a direction the opposite of the direction in which the static charge flowed.

It is obvious that my invention is applicable to a multiplex telegraph having any number of receiving-instruments, and that each of such instruments might have a compensating-coil, C, in a local circuit with a coil, I, independent of the circuit and coil I for the compensating-coil of other receivers, or that the current of a single coil, I, may do service for the coils C of two or more receivers. In Fig. 3 two receivers, R R², are shown, each having its compensating-coil C, both of which coils are in the same local circuit with the secondary coils I.

What I claim as my invention is—

1. A static compensator for duplex and multiplex telegraphs, consisting of an inductorium one coil of which is in circuit between the main line and the point of division of the main and artificial lines, while the other is in a closed circuit, including means for counteracting the effects of the static charge and discharge current upon the receiving apparatus.

2. The combination, with a duplex or multiplex telegraph, of a magnet placed in the main-line circuit at a point beyond the point of division of the main and artificial lines, so as to tend by its own inductive effects to cut down or oppose the effects of the static discharge current which would otherwise flow to and produce a false signal upon the receiving-relay, and a secondary or supplemental coil upon said magnet, placed in a closed local circuit, with a compensating-coil arranged to counteract the disturbing effects of static discharge-current upon the receiving apparatus.

3. The combination, in a duplex or multiplex telegraph, of a compensating electro-magnet in the line at a point beyond the point of division of the main and artificial lines, a secondary coil and a static compensating-coil for the receiving-relay, said compensating-coil being in closed local circuit with said secondary coil.

4. The combination, in a duplex or multiplex telegraph, of a compensating electro-magnet in the line at a point beyond the point of division of the main and artificial lines, a secondary coil and a static compensating device for the receiving apparatus, said static compensating device being in a circuit with the secondary coil, as and for the purpose described.

Signed at New York, in the county of New York and State of New York, this 7th day of March, A. D. 1884.

FRANCIS W. JONES.

Witnesses:
 THOS. TOOMEY,
 GEO. C. COFFIN.